Sept. 1, 1942.  F. S. BOROUGHS  2,294,444
TRANSPARENCY VIEWER
Filed Nov. 22, 1941
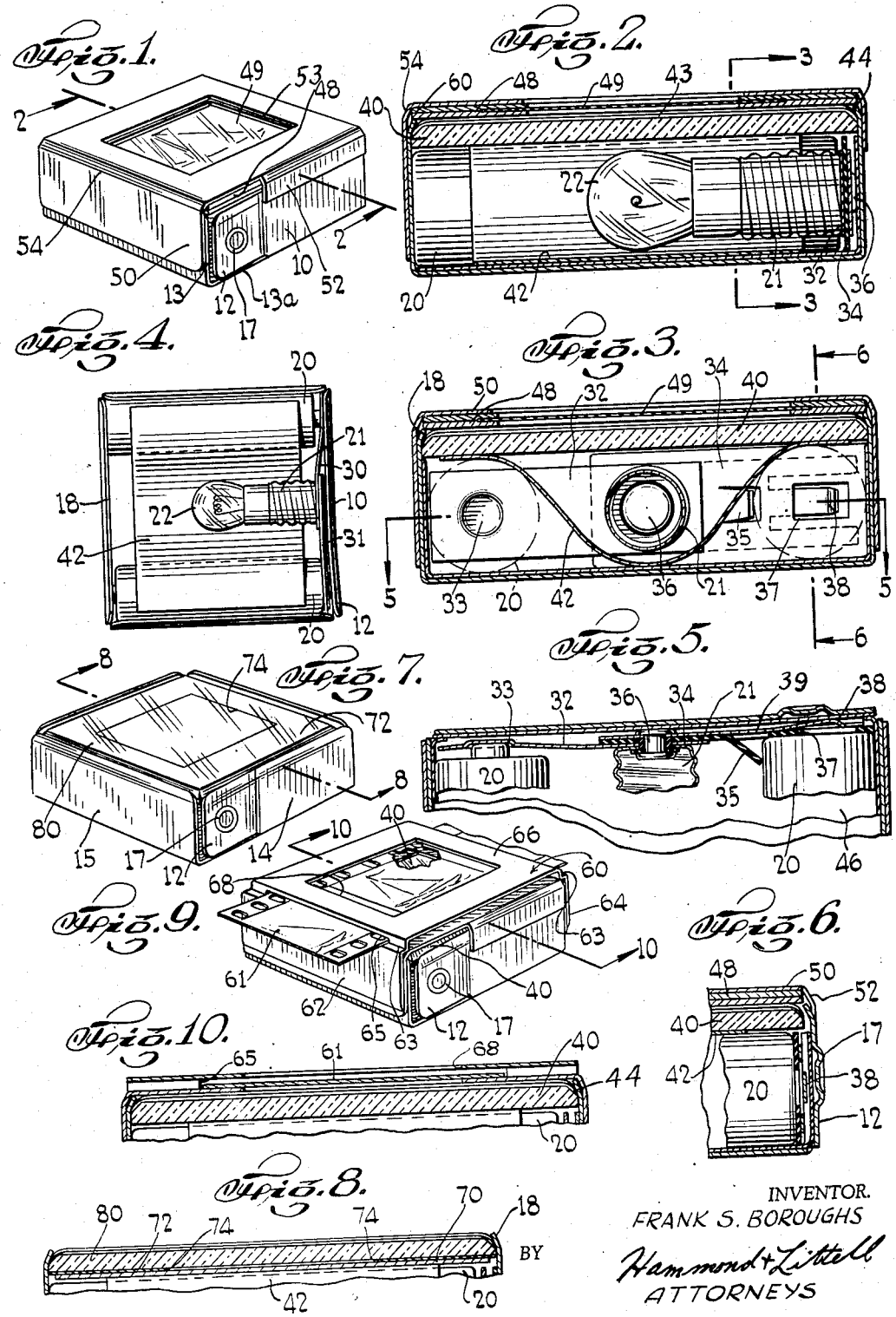
INVENTOR.
FRANK S. BOROUGHS
BY
Hammond + Littell
ATTORNEYS Patented Sept. 1, 1942

2,294,444

UNITED STATES PATENT OFFICE 2,294,444

TRANSPARENCY VIEWER

Frank S. Boroughs, Elmhurst, N. Y.

Application November 22, 1941, Serial No. 420,065

12 Claims. (Cl. 40—132)

This invention relates to a pocket size viewer for color and black and white transparencies.

There has been a steadily growing interest in amateur photography, particularly in the so-called candid camera field. The small size of the film used for these pictures permits the amateur photographer to take pictures and have them developed at a relatively low cost, enlarging only those that are of sufficient interest to merit additional expense. Interest in this field of photography has been further stimulated by the development of the modern 35 mm. color film. This particular part of the field has, however, not developed as rapidly as it might have in view of the relatively high cost of the necessary accessories, such as a projector, to properly enjoy the finished picture. Those who only took occasional color shots and had no projector were forced to hold the developed positive up against a light to view them with any degree of satisfaction. Furthermore, even those who had projectors were often forced to use this unsatisfactory method for want of a better one, unless they were willing to carry their projectors around with them whenever they wished to show their pictures to friends and acquaintances. Obviously, this retarded the use and enjoyment of the colored pictures to a large extent.

Although the projected pictures bring out a wealth of detail which may otherwise escape the observer, the color film can also be observed with a great deal of satisfaction if the positive print is properly illuminated. A small pocket size illuminator was developed for this purpose by David et al. and described in Patent No. 2,206,865. Although the device described in the patent is a less expensive accessory than a projector, its construction is such that for best results the positive color prints must be mounted in a special mount. That is, each of the prints returned from the developer in a ready mount must be incorporated in what he calls a "self-contained pack" before being ready for use in the viewer.

It is an object of this invention to provide a pocket size viewer of simple construction which is particularly well adapted for use in the illumination and viewing of color film prints in the ready mounts provided by the developer, or the standard slides used in projectors.

Another object of this invention is to provide a pocket size viewer in which means are provided for permitting ready replacement of one color print with another with the minimum amount of effort.

Another object of this invention is to provide a pocket size viewer of this type of very simple and inexpensive construction.

Other objects and advantages of the device of this invention will become apparent as the description proceeds.

In the drawing, which illustrates pocket size viewers embodying features of this invention Figure 1 is a perspective view of a preferred embodiment showing the cover piece in position on the casing and the resilient tongue-like side wall of the casing;

Figure 2 is a side elevation along the plane of the line 2—2 of Figure 1;

Figure 3 is a front elevation along the plane of the line 3—3 of Figure 2;

Figure 4 is a plan view of the casing showing the relative positions of the reflector, the light bulb and the power unit;

Figure 5 is an enlarged plan view partly in section of the front portion of the casing showing the switch structure;

Figure 6 is a partial side elevation along the plane of the line 6—6 of Figure 3 showing the tongue switch structure;

Figure 7 is a perspective view of a second embodiment of this invention;

Figure 8 is a partial side elevation along the line 8—8 of Figure 7;

Figure 9 is a perspective view of a modified embodiment of the viewer of this invention; and Figure 10 is a partial side elevation along the line 10—10 of Figure 9.

The form of pocket size viewer illustrating an embodiment of this invention includes in general a casing 10, a power unit including batteries 20, an electric light bulb 22, a connector and switch 31, a diffusion plate 40, and a hood or cover 50.

It should be understood that the pocket size viewer of this invention can be made in any number of shapes and sizes, the drawings being merely illustrative of a flat form which can be readily carried in a pocket or purse. The casing 10 of the viewer of this invention may have any one of a number of shapes or designs, the essential feature being that at least one of its side walls is provided with a loose resilient tongue-like portion, such as the tongue 12. In the casing illustrated, this is accomplished by providing a slot 13 between the edges of the side walls 14 and 15, and a slot 13a connecting with slot 13 separating a portion of the side wall 14 from the bottom of the casing. Each of the side walls there shown is resilient to some degree in that none of the walls are fixedly fastened to one another at the corners of the casing. This permits a certain resilient freedom of movement wherein the walls may be sprung apart to permit the insertion of a large member. The side walls are further provided with inwardly projecting flanged-like edges 18 whose function will be explained as the description proceeds.

The batteries 20 naturally can be any small battery, sufficiently small to be positioned in the pocket size casing. The standard pencil light batteries are quite suitable for this purpose. These comprise the power unit which is the source of electrical energy to light the bulb 22 seated in socket 21 and connected in circuit with the batteries through a spring-like connecting element 30, part of which is designated to act as a switch 31.

The spring like element 30 may be of any design which will permit of its serving as a means of putting the bulb 22 in circuit with the power unit, and as a circuit switch. Figures 3, 4 and 5 illustrate an embodiment having features which make it particularly well adapted for the purpose. The spring-like element there shown is made in two sections with a relatively stiff metal portion 32 in electrical contact with the socket 21, and a member 39 connected to contact button 36 but insulated from the metal portion 32 by an insulating member 34. The stiff metal portion is provided close to its extreme end with an indented portion 33. This indented portion serves as a firm seat and contact point for the protruding pole of one of the batteries, and helps to keep it from slipping out of place in the casing when the parts are assembled. The member 39 in conjunction with the insulating member 34 comprises the switch member. The insulating member 34 extends out beyond the end of the member 39, the end portion being provided to insulate the bottom of the battery casing from the end of the member 39 when the parts are in assembled position. The insulating member is also provided with a tab 35. This tab serves to help seat the base of the battery casing and keep it from slipping out of position. An opening 37 is provided near the end of the insulating member. This opening permits tongue 38 of the member 39 to contact the battery casing and close the circuit when pressure is brought to bear on the tongue member.

A suitable connecting member could be used to complete the circuit by connecting the batteries at the other end. However, in the illustrated examples the casing is made a part of the circuit. This eliminates the need for an additional connecting member. In the device illustrated the bottom, front and two side walls are lined with insulating material 46. A sheet of paper is usually sufficient. This leaves only the back side wall free to contact the battery terminals when the parts are in assembled position. A piece of reflecting material 42 is positioned across the top of the batteries and in back of the light bulb to block out the colors that would otherwise be reflected from the battery covers, as well as to concentrate the light given by the bulb and reflect it upwardly.

The light diffusing plate 40 may be one of any number of types. However, it should be positioned sufficiently close to the bulb to insure a high light, that is, a spot on the diffusion plate where the light is decidedly brighter than at other portions. However, the light source and diffusion plate should not be too close as that will produce an undesirable hot spot. The high light should be located in the center and slightly toward that part of the diffusion plate which abuts the front wall. A high light when properly placed will do much to add quality to any picture by giving it a three-dimensional effect. In the viewer illustrated, a thick beveled edge glass 40 with an opal flash 43 on its top surface acts as the diffuser. It has been found that a high light of the proper intensity is obtained by having the opal flash surface on the top surface of the glass when the thick glass is resting on the battery surfaces, as shown in the drawing. The beveled edges 44 of the glass cooperate with the flange-like edges 18 of the casing to prevent the glass from slipping out of position. The resiliency of the side walls of the casing permits the glass diffusing plate to be sprung into place and after its passage the spring action serves to help clamp it firmly in position.

The hood or cap piece 50 of the viewer may also be of any suitable design or construction but should be provided with an opening in the top of sufficient size to permit the viewing of a 35 mm. color print therethrough, have sufficient top surface to engage any support 48 upon which any 35 mm. color print 49 is mounted, and should when firmly fixed in the viewer casing enable one to rapidly gain access to tongue 12 of the casing without first adjusting the hood 50.

In the preferred embodiment illustrated in Figure 1, the hood or cap piece 50 is a substantial replica of the casing with a few modifications. The front side wall of the hood or cap is cut out entirely in the corner which would otherwise be in superimposed position to the tongue 12 when the cap is in position on the casing. The remainder of the front side wall is also partially cut away leaving only a flange 52 which fits over a portion of the front side wall, and helps to center and firmly hold the cap in place. In the preferred embodiment of the cap illustrated all four of the edges are provided with a centralizing angle 54. This angle helps to make certain that a standard slide mount placed between the diffusion plate and the cap 50 will be properly centralized.

A great deal of satisfaction and enjoyment can be derived in looking at color prints with the aid of the viewer of this invention. This viewer is adapted for use with the color prints in the cardboard ready mounts in which they are returned by the developer, or in the more elaborate standard slide mounts. No extra preparation is necessary. The pictures can readily be viewed by either removing the cap entirely or by raising the front sides sufficiently to provide clearance between the top of the casing and the flange 52 to permit insertion of the mounted picture. When the cap is forced down the centralizing angles 54 contact the edges of the mount 48 and centralize the picture. The color print in this position can then readily be viewed through the opening 53 of the cover when the bulb is lit. The depression of the tongue 12 closes the circuit which produces the illumination necessary to get a maximum degree of satisfaction in viewing the color transparency.

A ridged protruding portion 17 is provided on the tongue 12 of the preferred embodiment of the viewer casing. This ridge is of sufficient height so that when the cap 50 is turned 90 or 180 degrees the back or side walls of the cap will keep the tongue 12 sufficiently depressed to keep the circuit closed and the light on. This is quite handy when one wishes to view a number of pictures in succession.

The modified viewer illustrated in Figure 9 is particularly well adapted for viewing a group of color prints consecutively. The viewer there shown is identical with the viewer shown in Figure 1 in all essential details with the exception of an added member which makes it possible to view a number of color prints consecutively without lifting or otherwise adjusting any part of the viewer. The added element which makes this possible is a hood 60. This hood has a U-shaped cross section and consists of side walls 62 and 64, and a top wall 66, the top wall being provided with an opening 68, of substantially the same dimension as the opening in cap 50, through which the pictures are viewed. Each of the side walls is provided with an inwardly projecting flanged portion 63 near its junction with the top wall 66. When the parts are in assembled position the walls 62 and 64 fit over the side walls of the cap 50. The inwardly projecting flanges 63 rest on top of the cap 50 and hold the top wall 66 of the hood in spaced relationship to the top wall of cap 50. In this position the opening in the hood overlies the opening in the cap 50. The spacing between the top of the hood and the top of the cap is of sufficient size to permit the insertion of color prints in their ready mounts through the opening at the front of the viewer and their withdrawal from the opening at the rear when the next picture is inserted. As can readily be seen, this permits the consecutive viewing of pictures without adjusting the parts of the viewer.

On a great many occasions the amateur photographer is interested in determining which of his negatives on the strip of 35 mm. film is worth enlarging. In such cases it is necessary for him to either have prints made or evaluate the worth of the picture by viewing the picture with the aid of illumination. Such illumination is not always as satisfactory as it might be in view of the fact that the picture is not framed and many distractions can be noted. The slits 65 in the side walls of the hood make the viewer shown in Figure 9 particularly well adapted for viewing such negatives. By inserting one end of the negative 61 into the slits 65 in the side wall 62 and withdrawing the end through the slit in the side wall 64 any frame of the exposed film may be positioned within the frame opening, and subsequently viewed to good advantage by merely depressing tongue 12 of the casing.

Figures 7 and 8 illustrate a modified form of viewer which will be referred to as a gift box, since that is what it is most suitable for. This box is quite similar in design and construction to the viewer with the cap 50. It has the same casing 10 with the resilient tongue 12, partially resilient side walls 14 and 15 and power unit. However, instead of a thick glass diffusion disk having an opal flashed top surface, a thin diffusion plate 70 is provided which rests immediately adjacent the battery surface and below a thick beveled glass disk 80 whose inside has been mirrored at 72 to form a frame with a clear opening 74 of approximately the size of a 35 mm. picture. This viewer is most suitable for use as a gift box in view of the fact that when the color print is placed in position by placing the mount between the beveled glass and the diffusion plate, it makes an attractive gift package for the color print. Although other prints can be illuminated with the aid of the power unit in the casing of the gift box, the method of replacing one color print by another is too clumsy for the consecutive ready viewing of prints.

It has been further found that if a yellow tinted diffusion plate of the type 70 is used in combination with a blue tinted glass top, the reddish tint ordinarily given to the light is completely neutralized and the light given off is a daylight white. If desired, this combination can naturally also be used in the viewer in place of the opal finished diffusion plate.

Other desirable features of the viewers of this invention and advantages to be gained by their use will become apparent to those skilled in the art.

It will be understood that the embodiment of my invention described in this specification and illustrated by the drawing is only a form of the viewer of this invention. I therefore desire an interpretation of the invention which is fully commensurate with its contribution as set forth in the claims appended hereto.

I claim:

1. In a pocket size viewer for color and black and white transparencies, a casing having at least one side wall with a loose resilient tongue-like portion, a power unit and an electric bulb connected in circuit therewith and mounted therein and adapted for illumination by depression of said tongue-like portion, a light diffusing member mounted in said casing and forming its top wall, and a cap-like member adapted to fit over the casing, said cap-like member having a cutout side wall portion to permit ready access to the tongue-like portion of said wall of said casing, and having an opening in its top surface of suitable size to permit the viewing of illuminated 35 mm. pictures positioned on said light diffusing member below said cap-like member.

2. In a pocket size viewer for color and black and white transparencies, a casing having at least one side wall which consists in part of a loose resilient tongue-like portion, a power unit and an electric light bulb connected in circuit and adaptably mounted therein for illumination by depression of said tongue-like portion, a light diffusing member mounted in said casing forming its top wall, and a cap-like member adapted to fit over the top of the casing, one of the side walls of said cap-like member being entirely cut away in that portion which overlies the loose tongue-like portion of the casing when the parts are assembled and partially cut away at the other end leaving only a small flange-like portion sufficient to hold the cap in position, said cap-like member having an aperture in its top surface of suitable size to permit the viewing of illuminated transparencies positioned on said light diffusing member below said cap-like member.

3. In a pocket size viewer for color and black and white transparencies, a casing having at least one side wall which consists in part of a loose resilient tongue-like portion, a power unit and an electric light bulb connected in circuit and adaptably mounted therein for illumination by depression of said tongue-like portion, a light diffusing member mounted in said casing forming its top wall, and a cap having a top and side walls, said top wall having a rectangular viewing aperture of suitable size to permit the viewing of illuminated transparencies positioned on said light diffusing member below said cap, the side wall overlying the loose tongue of the casing being entirely cut away where it overlies the tongue leaving only a short flange-like portion overlying the remainder of the side wall, said cap being provided with centralizing angles at the point where the side wall and the top wall join to help centralize any mounted transparency lying on the diffusion plate when the cap is pressed into place.

4. In a pocket size viewer for color and black and white transparencies, a casing having a bottom and side walls with slits separating the walls from each other, one of said side walls being separated from the bottom of said casing at one end by a slit connecting with the slit separating the side wall from the next adjacent side wall thereby forming a resilient tongue-like portion, and a cap-like member adapted to fit over the casing, said cap-like member having a cutout side wall portion to permit ready access to the tongue-like portion of said wall of said casing, and having an opening in its top surface of suitable size to permit the viewing of illuminated 35 mm. pictures positioned on said light diffusing member below said cap-like member.

5. In a pocket size viewer for color and black and white transparencies, a casing having a bottom and four side walls with slits separating the side walls from each other, one of said side walls being separated from the bottom of said casing at one end by a slit connecting with the slit separating the side wall from the next adjacent side wall thereby forming a resilient tongue-like portion, each of said side walls at its extreme outer end being provided with an inwardly projecting flange, a power unit and an electric bulb connected in circuit therewith and mounted therein and adapted for illumination by depression of said tongue-like portion, a light diffusing member mounted in said casing and forming its top wall, and a cap-like member adapted to fit over the casing, said cap-like member having a cutout side wall portion to permit ready access to the tongue-like portion of said wall of said casing, and having an opening in its top surface of suitable size to permit the viewing of illuminated 35 mm. pictures positioned on said light diffusing member below said cap-like member.

6. In a pocket size viewer for color and black and white transparencies, a casing having a bottom and four side walls with slits separating the side walls from each other, one of said side walls being separated from the bottom of said casing at one end by a slit connecting with the slit separating the side wall from the next adjacent side wall thereby forming a resilient tongue-like portion, each of said side walls at its extreme outer edge being provided with an inwardly projecting flange, a power unit and an electric light bulb connected in circuit and adaptably mounted therein for illumination by depression of said tongue-like portion, a thick glass light diffusing member having a beveled edge adapted for cooperating with said inwardly projecting flanged edges of said side walls to hold the glass firmly in place across the top of the casing, and a cap-like member adapted to fit over the casing, said cap-like member having a cutout side wall portion to permit ready access to the tongue-like portion of said wall of said casing, and having an opening in its top surface of suitable size to permit the viewing of illuminated 35 mm. pictures positioned on said light diffusing member below said cap-like member.

7. In a pocket size viewer for color and black and white transparencies, a casing having a bottom and four side walls with slits separating the side walls from each other, one of said side walls being separated from the bottom of said casing at one end by a slit connecting with the slit separating the side wall from the next adjacent side wall thereby forming a resilient tongue-like portion, each of said side walls at its extreme outer edge being provided with an inwardly projecting flange, a power unit and an electric light bulb connected in circuit and adaptably mounted therein for illumination by depression of said tongue-like portion, a thick beveled glass plate of substantially the area and size of the bottom of the casing and provided with an opal flash on its top surface, said glass forming the top wall of said casing and being held in place by cooperation of the beveled edge with the inwardly projecting flanges of the side walls, said opal surface being spaced at such distance from said light bulb as to provide a high light on said opal surface when said light is lit, and a cap-like member adapted to fit over the casing, said cap-like member having a cutout side wall portion to permit ready access to the tongue-like portion of said wall of said casing, and having an opening in its top surface of suitable size to permit the viewing of illuminated 35 mm. pictures positioned on said light diffusing member below said cap-like member.

8. In a pocket size viewer for color and black and white transparencies, a casing having a bottom and side walls with slits separating the walls from each other, one of said side walls being separated from the bottom of said casing at one end by a slit connecting with the slit separating the side wall from the next adjacent side wall thereby forming a resilient tongue-like portion, a power unit consisting of two small batteries, an electric light bulb connected in circuit therewith through the casing, a connecting member and switch, said connecting member having an indent at one end for contacting the protruding pole of the battery and holding it in seating engagement to prevent sidewise movement and having a projecting tab-like portion toward the other end to contact the side of the other battery and hold it against the side wall of the casing, said switch being adaptably mounted for cooperating with the tongue-like member of the casing to close the circuit.

9. In a pocket size viewer for color and black and white transparencies, a casing having a bottom and four side walls with slits separating the side walls from each other, one of said side walls being separated from the bottom of said casing at one end by a slit connecting with the slit separating the side wall from the next adjacent side wall thereby forming a resilient tongue-like portion, each of said side walls at its extreme outer edge being provided with an inwardly projecting flange, a power unit and an electric light bulb connected in circuit and adaptably mounted therein for illumination by depression of said tongue-like portion, a thin light diffusing member mounted in said casing above said light bulb and a beveled glass cover piece adapted to fit over a transparency lying on said light diffusing member and to be held in place as a cover piece by the cooperation of its beveled edges with the inwardly projecting flanges of the side walls, said cover piece being provided with a mirrored surface framing a transparent portion of sufficient size to view a transparency.

10. In a pocket size viewer for color and black and white transparencies, a casing having a bottom and side walls with slits separating the walls from each other, one of said side walls being separated from the bottom of said casing at one end by a slit connecting with the slit separating the side wall from the next adjacent side wall thereby forming a resilient tongue-like portion, a power unit and an electric bulb connected in circuit therewith and mounted therein and adapted for illumination by depression of said tongue-like portion, a light diffusing member mounted in said casing and forming its top wall, a cap-like member adapted to fit over the casing, said cap-like member having a cutout side wall portion to permit ready access to the tongue-like portion of said wall of said casing, and having an opening in its top surface of suitable size to permit the viewing of illuminated 35 mm. pictures positioned on said light diffusing member below said cap-like member, and a hood consisting of a top and two side walls, said top wall being provided with a viewing aperture in alignment with and of the same size as the aperture in said cap, said side walls being provided with inwardly projecting flanges to insure that the top wall of the hood is spaced from the top wall of the cap to permit the insertion and withdrawal of mounted transparencies.

11. In a pocket size viewer for color and black and white transparencies, a casing having a bottom and side walls with slits separating the walls from each other, one of said side walls being separated from the bottom of said casing at one end by a slit connecting with the slit separating the side wall from the next adjacent side wall thereby forming a resilient tongue-like portion, a power unit and an electric bulb connected in circuit therewith and mounted therein and adapted for illumination by depression of said tongue-like portion, a light diffusing member mounted in said casing and forming its top wall, a cap-like member adapted to fit over the casing, said cap-like member having a cutout side wall portion to permit ready access to the tongue-like portion of said wall of said casing, and having an opening in its top surface of suitable size to permit the viewing of illuminated 35 mm. pictures positioned on said light diffusing member below said cap-like member, and a hood consisting of a top and two side walls, said top wall being provided with a viewing aperture in alignment with and of the same size and configuration as the aperture in said cap, said top wall being spaced from said top wall of said cap to permit the introduction of mounted transparencies therebetween, said side walls being provided with slots leading into the spaced portion to permit running a film therethrough.

12. In a pocket size viewer for color and black and white transparencies, a casing having at least one side wall with a loose resilient tongue-like portion, a power unit and an electric bulb connected in circuit therewith and mounted therein and adapted for illumination by depression of said tongue-like portion, a yellow tinted diffusion plate mounted in said casing, a beveled edge blue tinted glass plate mounted thereover forming the top wall of the casing, and a cap-like member adapted to fit over the casing, said cap-like member having a cutout side wall portion to permit ready access to the tongue-like portion of said wall of said casing, and having an opening in its top surface of suitable size to permit the viewing of illuminated 35 mm. pictures positioned on said light diffusing member below said cap-like member.

FRANK S. BOROUGHS.